Figure 1:
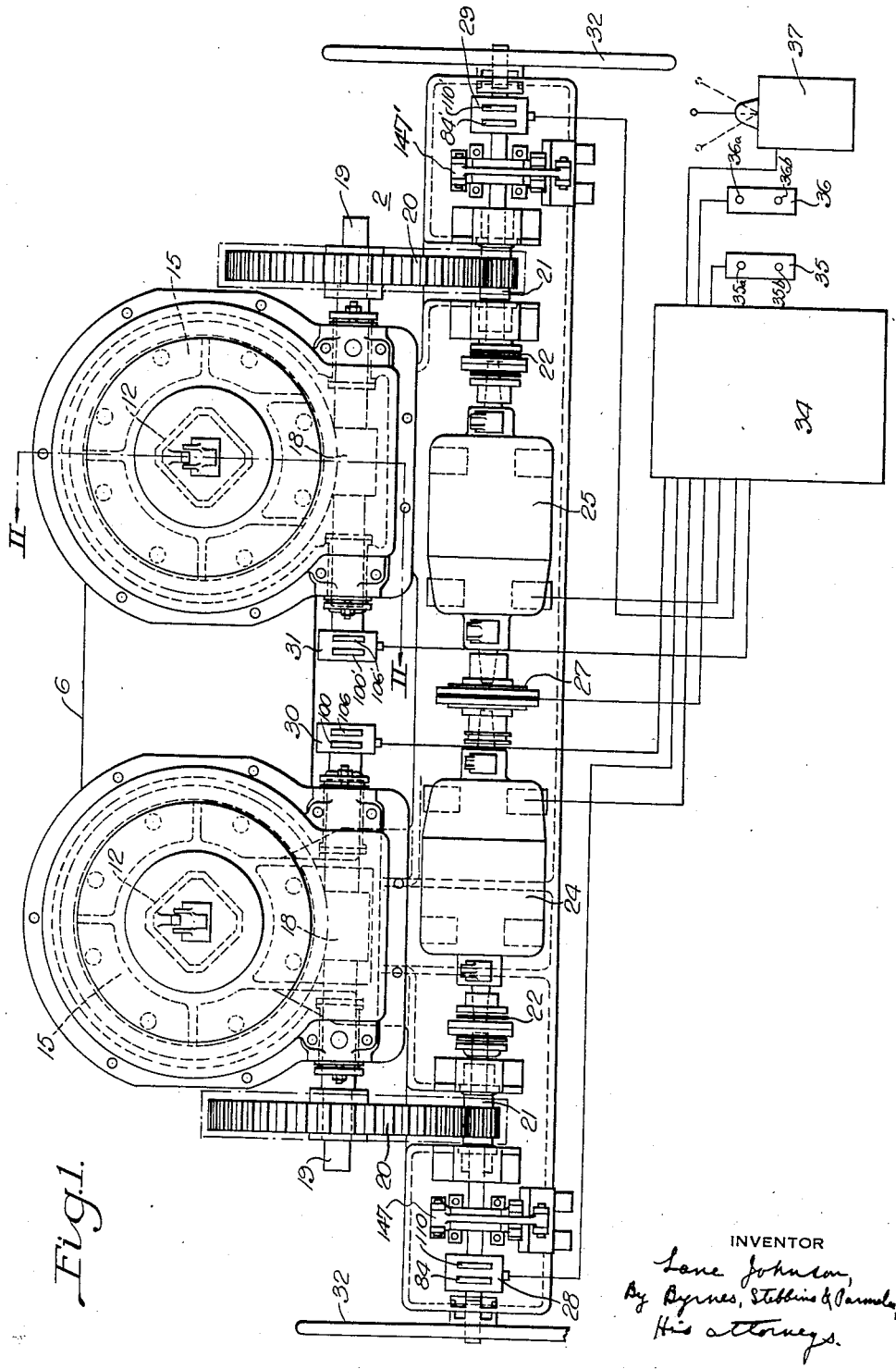

Oct. 14, 1930.  L. JOHNSON  1,778,672
ELECTRICAL CONTROL SYSTEM
Filed June 16, 1928  6 Sheets-Sheet 4

Fig.4.

INVENTOR
Lane Johnson,
By Byrnes, Stebbins
& Parmelee,
His attorneys.

Oct. 14, 1930.                L. JOHNSON                1,778,672
                       ELECTRICAL CONTROL SYSTEM
                         Filed June 16, 1928          6 Sheets-Sheet 5

Patented Oct. 14, 1930

1,778,672

UNITED STATES PATENT OFFICE

LANE JOHNSON, OF INGRAM, PENNSYLVANIA, ASSIGNOR TO UNITED ENGINEERING & FOUNDRY CO., OF PITTSBURGH, PENNSYLVANIA, A CORPORATION OF PENNSYLVANIA

ELECTRICAL CONTROL SYSTEM

Application filed June 16, 1928. Serial No. 285,819.

My invention relates to an electrical control system and particularly to a control system in which several screw downs are selectively driven from a plurality of motors. A plurality of screw downs and a plurality of motors are electrically controlled for driving a single screw down in either direction from one motor, or a plurality of screw downs are driven in either direction from one motor by the manipulation of an electromagnetic clutch, or a plurality of screw downs are operated in the same direction by a plurality of motors connected through a magnetic clutch. Provision is made for stopping the motors at the end of each revolution, or the motors may be operated continuously within the operating range of the screw downs.

While the present invention is applicable to the control of motors in general, certain of the features thereof are particularly applicable for controlling the screw downs shown and described in the application of Clarence J. Klein and Walter W. McBane, Serial No. 161,387, filed January 15, 1927, and assigned to the United Engineering and Foundry Company.

In the operation of screw downs in general, and particularly for pressure rolls, minute differences in the elevation of the bearings at either end of the rolls is sufficient to give material traversing the rolls a lateral movement, which is injurious to the roll bearings, the frame in which the rolls are mounted and to the material itself. For such purposes an adjustment as fine as five ten thousandths of an inch is sometimes required. To obtain the nicety of adjustment required for such purposes, there is shown in the Klein and McBane application a pair of screw downs, each of which is mechanically connected to a motor. An electromagnetic clutch selectively connects the motors so that both screw downs may be operated in either direction from a single motor or both screw downs may be simultaneously operated from the interlocked motors.

I provide a control system for several motors and an electromagnetic clutch by which any motor, or a plurality of motors, may be rotated one revolution in either direction to turn a connected screw down or screw downs. Limit switches and push-button switches are provided for controlling such an operation. The operation, if carried on for a plurality of revolutions, may be called a step-by-step operation. The electromagnetic clutch is controlled by a master switch or controller so that any motor may be connected for driving both screw downs in either direction for a complete revolution. The master switch is also so connected to the motors that in certain positions it is capable of controlling all of the motors and the electromagnetic clutch for simultaneously and continuously operating the motors and screw downs while they are interlocked.

Figure 2:
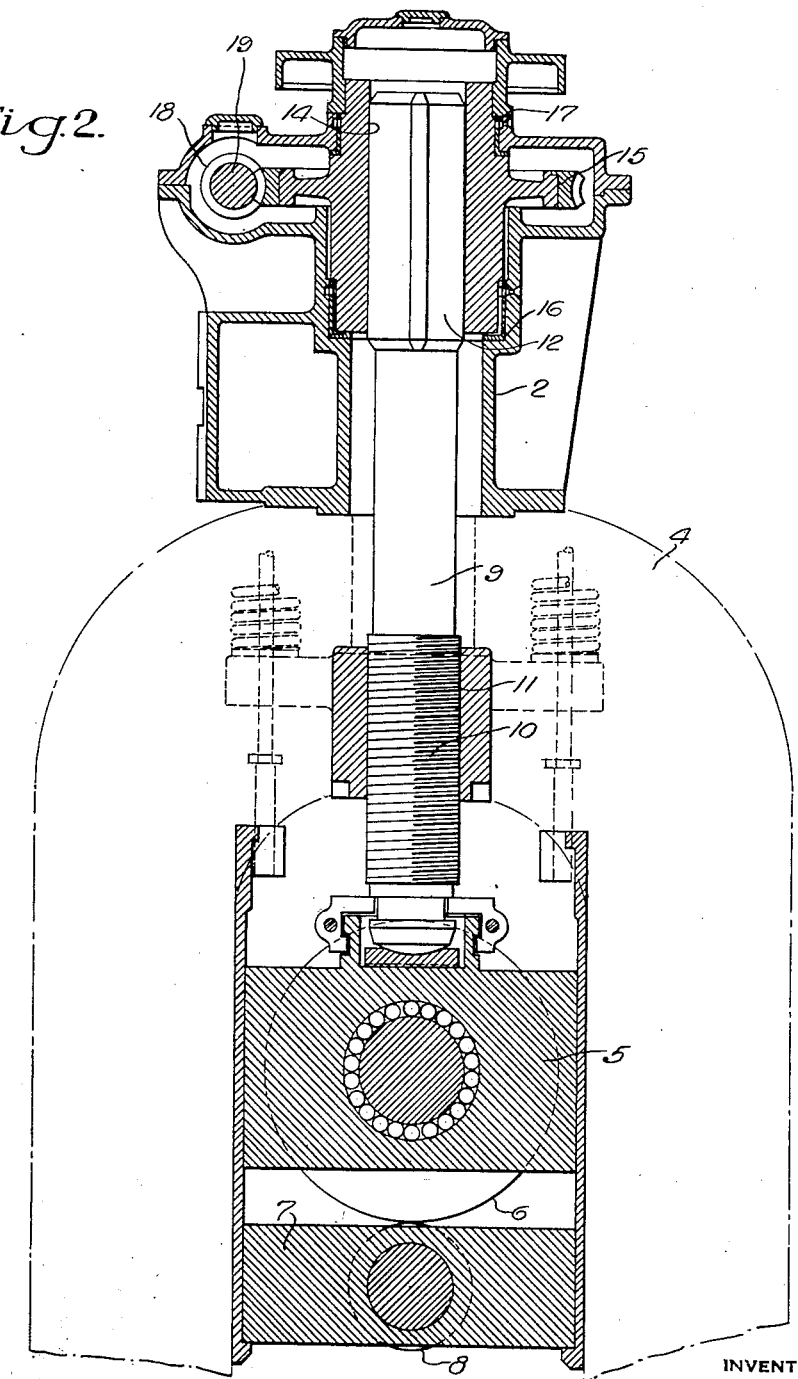
Figure 3:
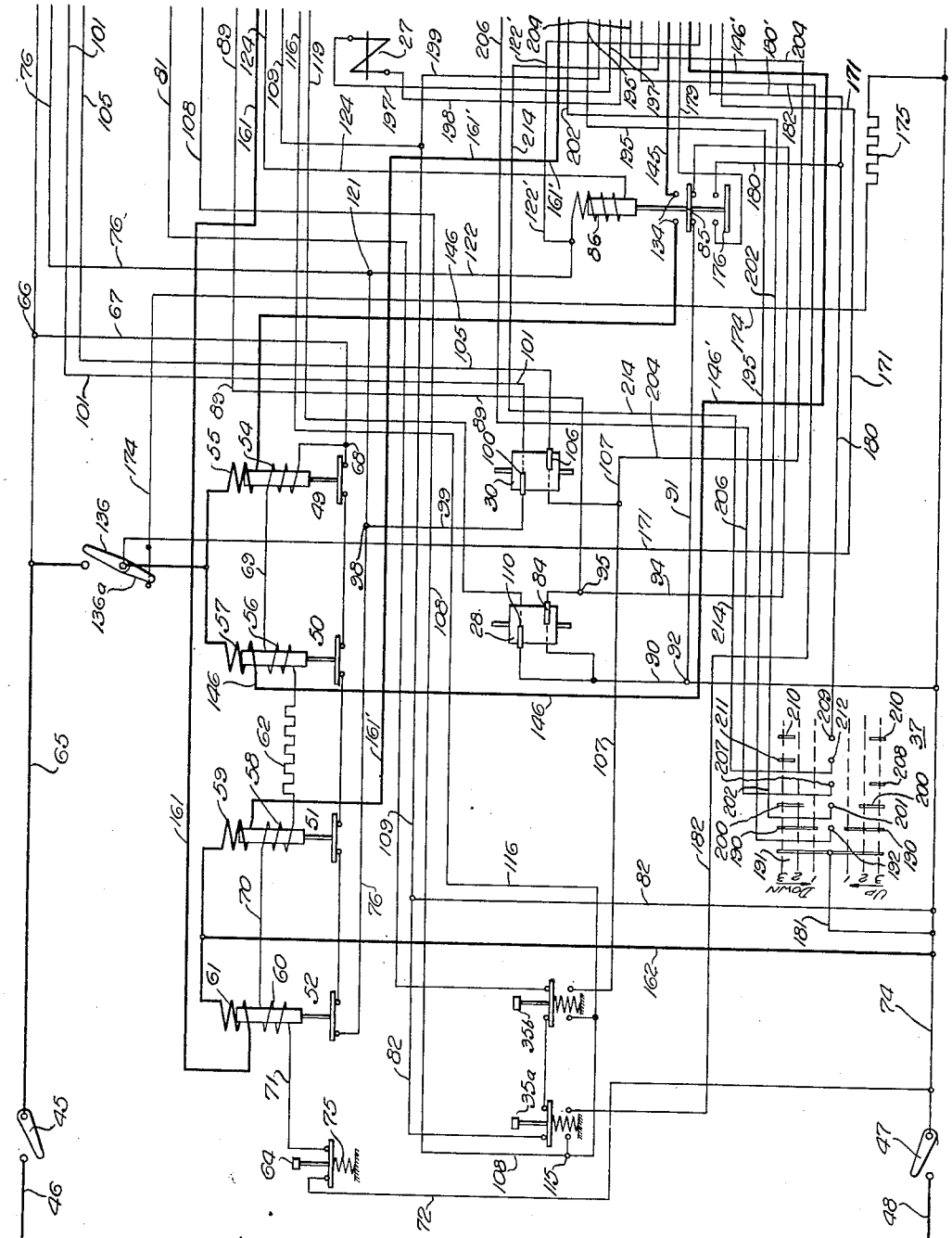
Figure 6:
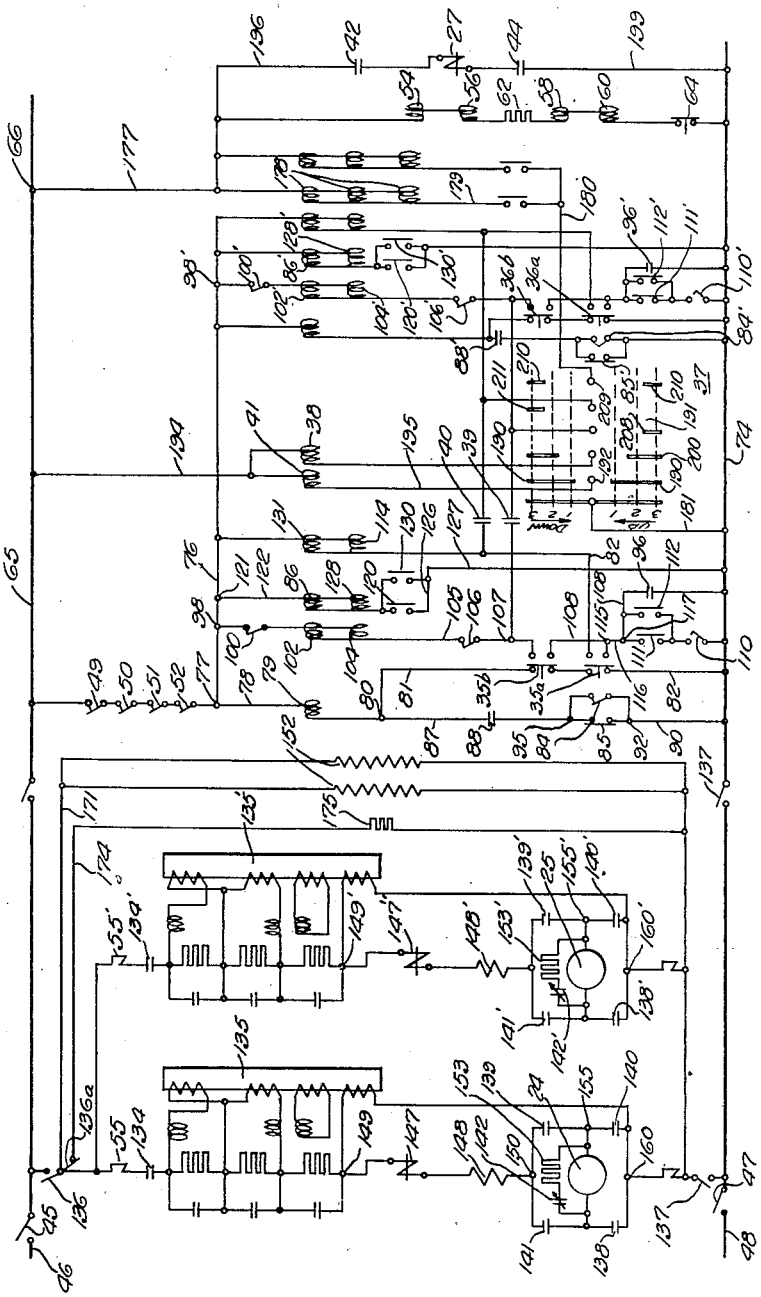

The accompanying drawings illustrate the present preferred embodiment of the invention, in which, Figure 1 is a diagrammatic plan view of circuits and apparatus embodying my invention, Figure 2 is a sectional view through one of the screw downs taken substantially along the section line II—II of Figure 1, Figures 3, 4 and 5 are each fragmentary views of a wiring diagram for the control system. When Figures 3, 4 and 5 are placed in end-to-end position a complete wiring diagram of the system is had, and Figure 6 is a simplified straight wiring diagram of the system.

Referring to Figures 1 and 2, a composite frame 2 is mounted above stanchions 4 housing bearings 5 for a pressure roll 6 and the bearings 7 for a shaping or working roll 8. The bearings 5 are each connected to a shaft 9 having a threaded portion 10 working in threads 11 in one of the stanchions 4. Upward or downward movement of the shaft 9 raises or lowers the bearings 5 for the pressure roll 6, thereby controlling the relative positions of the axes of the rolls 6 and 8 in the stanchions 4. The upper end of the shaft 9 is provided with a squared portion 12. The squared portion 12 extends through an opening 14 in the hub of a worm gear 15.

Each worm gear 15 is mounted in the frame 2 and is prevented from moving longitudinally of the shaft by shoulders 16 and 17 formed thereon which engage cooperating shoulders on the parts of the frame 2. A worm 18 mounted on a shaft 19 meshes with each of the worm gears 15. Each shaft 19 is connected by a reducing gear train 20 to a shaft 21. The shafts 21 are connected by flexible couplings 22 to motors 24 and 25.

The motors 24 and 25 are similar, but for convenience in describing the control of motors, the motor at the left of Figure 1 is given the reference numeral 24 and the motor at the right is given the reference numeral 25. An electromagnetic clutch 27 is interposed between the shafts of the motors 24 and 25. For limiting the movement of the motor 24 to a single revolution, a limit switch 28 is coupled to the shaft 21. A similar limit switch 29 is provided for the motor 25.

For controlling the maximum upward movement of the rolls 6, limit switches 30 and 31 are geared to the shafts 19 attached to the motors 24 and 25, respectively. Hand wheels 32 are provided for turning the shafts 21, if desired.

Electrical connections are made from the motors 24 and 25, the electromagnetic clutch 27 and the limit switches 28, 29, 30, and 31 to a panel board 34. Push button switches 35 and 36 are connected to the panel board 34 for controlling the raising ("up") or the lowering ("down") movement of either of the motors through one revolution. The push-button switch 35 controls the motor 24 while the switch 36 controls the motor 25. A master controller 37 having a neutral position and three positions in each of a plurality of directions is connected to the panel board 34 for controlling the electromagnetic clutch 27 for controlling the combined operation of the two motors in cooperation with the push-button switches 35 and 36 for one revolution of the motors, and for controlling the continuous operation of the motors 24 and 25, as hereinafter more fully described.

The push-button switches 35 and 36 are each provided with two series of contacts 35$^a$ and 35$^b$, 36$^a$ and 36$^b$ for controlling "down" and "up" movements of the motors 24 and 25, respectively. Each switch contact 35$^a$, 35$^b$, 36$^a$ and 36$^b$ comprises a bridging member that is spring pressed into engagement with a pair of terminals and another pair of terminals into engagement with which the bridging member is moved in opposition to the spring. With this construction, upon release of the switch contacts, the bridging members always return to a circuit closing position.

The circuit connections for the motors 24 and 25 are such that when a single revolution of the motor is desired, the movements of the motors are controlled by the push button switches 35 and 36. If the master controller 37 is in the neutral position, each motor is controlled by its individual push button and operates only the end of the roll to which it is mechanically connected. If the master controller 37 is in its first position in either direction, each motor is operated by its individual push button switch, but due to the clutch 27 being energized, it operates both ends of the roll. If the master controller 37 is in either second position, either push button switch operates both motors simultaneously which moves both ends of the roll. The above operations are limited to one revolution of the motor due to the limit switches 28 and 29.

When the master controller 37 is placed in either of its third positions, the push button switches 35 and 36 and the one revolution limit switches 28 and 29 become ineffective, the motors both operating "up" and "down" from the master controller. Also the accelerating circuits for the motors are effective and operation continues "downward" until stopped by the master controller or by the overload relays, or continues upward until stopped by the master controller or up-travel limit switches 30 and 31.

The electromagnetic clutch 27 is controlled through a contactor 41 having front contacts 42 and 44. In tracing the circuits hereinafter described, the circuits are carried from a knife blade switch 45 in a supply conductor 46 to a knife blade switch 47 in a supply conductor 48. The conductors 46 and 48 are connected to a source of direct current electromotive force, although it is to be understood that the system may be adapted to use with alternating current and that such uses are contemplated within the scope of the claims appended hereto.

Overload relays 49, 50, 51 and 52 are each provided with a pair of windings 54—55, 56—57, 58—59, 60—61, respectively. The windings 54, 56, 58 and 60 are connected in series with a resistor 62 and an overload reset switch 64. The circuit extends from the switch 45 through a bus bar 65, a terminal 66, a conductor 67, a terminal 68, the winding 54, a conductor 69, the winding 56, a resistor 62, the winding 58, a conductor 70, the winding 60, a conductor 71, the overload reset switch 64, a conductor 72 and a bus bar 74 connected to the switch 47.

The reset switch 64 is normally urged to a circuit closing position by a spring 75. When the switch is opened against the spring 75, the circuit through the relay windings 54, 56, 58 and 60 is interrupted, and after the windings 55, 57, 59 and 61 are deenergized, as hereinafter described, the overload relays 49, 50, 51 and 52 return to their normal circuit closing positions. The overload relays are so connected to the relays for initiating the operation of the control system that the system cannot be started until the relays are all in their circuit closing positions.

"Up" movement of the motor 24 by the operation of switch contactor 35ᵇ

When the contact 35ᵇ is depressed, the motor 24 operates through one revolution, provided the limit switch 30 is closed. The limit switch 28 operates to terminate the rotation of the motor 24 at the completion of one revolution.

If the overload relays 49, 50, 51 and 52 are in their circuit closing positions, a circuit is completed from the switch 45 through the bus bar 65, the terminal 66, the conductor 67, the terminal 68, the contacts of the relays 49, 50, 51 and 52 in series, a conductor 76, a terminal 77, a conductor 78, a winding of a relay 79, a terminal 80, a conductor 81, the contacts 35ᵃ and 35ᵇ in series if in their normal position, a conductor 82 and the bus bar 74 to the switch 47. The circuit just traced cannot be completed if either of the contacts 35ᵃ or 35ᵇ are in their depressed condition or if any of the overload relays are in an open position. As it requires that one or the other of the contacts 35ᵃ or 35ᵇ be in a depressed condition to complete directional motor circuits hereinafter described, it follows that the completion of the circuit for the relay 79 does not start either motor.

From the terminal 80, a circuit extends in parallel to the contacts 35ᵃ and 35ᵇ for completing a holding circuit for the relay 79 provided that the contact 84 on the limit switch 28 is closed. The contact 84 is in parallel circuit with the back contact 85 of a relay 86. The circuit extends from the terminal 80 through a conductor 87, a front contact 88 of the relay 79, a conductor 89, the contact 84 of the limit switch 28, a conductor 90 and the bus bar 74 to the switch 47.

The back contact 85 is connected in parallel with the contact 84 by a conductor 91 extending from a terminal 92 on the conductor 90 through the back contact 85, and a conductor 94 to a terminal 95 on the conductor 89. Upon the completion of this circuit, the relay 79 is energized to complete its own holding circuit so long as the contact 84 on the limit switch 28 remains closed, or so long as the back contact 85 on the relay 86 remains closed. The presence of the back contact 85 insures an initially completed circuit for the relay 79. should the limit switch contact 84 be open.

The energization of the relay 79 closes its contact 96 for partially completing the directional circuits for the contacts 35ᵃ and 35ᵇ. The circuit heretofore traced in connection with the "up" movement of the motor 24 is equally applicable to the "down" movement of the same motor. The difference between the "up" or "down" movement of the motor 24 is controlled by circuits hereinafter described.

Upon the depression of the contact 35ᵇ against its spring, a circuit is completed from a terminal 98 on the conductor 76, which is connected through the contacts of the overload relays 49, 50, 51 and 52, to the bus bar 65, through a conductor 99, a contact 100 of the limit switch 30, a conductor 101, the winding of contactors 102 and 104 in parallel circuit, a conductor 105, the contact 106 of the limit switch 30, a conductor 107, the push button contact 35ᵇ in its depressed position, a conductor 108, the contact 96 of the relay 79, a conductor 109, the conductor 82, and the bus bar 74 to the switch 47. The completion of this circuit energizes the windings of the contacts 102 and 104.

The contact 96 of the relay 79 is in parallel circuit with the follow up contact 110 of the limit switch 28. As the contacts 84 and 110 are mechanically connected, both are closed only during a transitional period immediately preceding the opening of the contact 84.

The follow up contact 110 is in series circuit with the parallel connected contact 111 of the contactor 104 and a contact 112 of a contactor 114 disposed in the "down" control circuits for the motor 24. The series circuit for the contact 111 and the contact 110 extends from a terminal 115 on the conductor 108 through a conductor 116 to a terminal 117, the contact 111, a terminal 118 on a conductor 119, the conductor 119, the contact 110, the conductor 90, and the bus bar 74 to the switch 47. The contact 112 is connected across the terminals 117 and 118 by extensions of the conductors 116 and 119.

The energization of the contactors 102 and 104 serves to energize the motor 24 as hereinafter described. However, if the limit switch 30 is open, the circuit through the contactors 102 and 104 is interrupted at the contacts 100 and 106. Should the circuit be completed for energizing the relay 79 through the contacts 35ᵃ and 35ᵇ initially connected in series, the motor 24 would not be energized until either the switch contact 35ᵃ or 35ᵇ is energized, to complete a directional circuit for the motor. For completing the directional circuit, one or the other of the contacts must be depressed, and hence the energization of the relay 79 relies upon its contact 88 and the contacts 84 and/or 85 for completing its circuit when the switch contact 36ᵃ is depressed for completing the directional circuit through the windings of the contactors 102 and 104.

Upon the deenergization of the relay 79 while the switch contact 35ᵇ is depressed, the contact 96 is opened to interrupt the current traversing the switch contact 35ᵇ, unless the contacts 110 and/or the contacts 111 be closed. Accordingly, the motor 24 cannot be energized indefinitely through the contact 96, but ultimately depends upon the current traversing the contact 110 of the limit switch 28.

For opening the circuit of the winding of the relay 79, through the contact 85, the winding of the relay 86 is energized upon the closing of the contact 120 of the contactor 102. Accordingly, after the energization of the contactor 102, the control of the relay 79 is dependent upon the contact 84 of the limit switch 28, which opens shortly after the motor starts. The circuit controlled by the contact 120 extends from a terminal 121 on the conductor 76, which is connected to the switch 45 through the circuit previously traced. The circuit extends from the terminal 121 through a conductor 122, the winding of relay 86, a conductor 124, a terminal 125, the contact 120, a conductor 126, a conductor 127 and the bus bar 74 to the switch 47.

The winding of a relay 128 is connected from the conductor 76, through a conductor 129 and a front contact 130 on a relay 131, the conductor 126, the conductor 127, and the bus bar 74 to the switch 47. Accordingly, the relay 86 and contact 120 are in parallel circuit with the relay 128 and contact 130 between the conductors 76 and 127. The relays 86 and 128 are connected in parallel to the contacts 120 and 130 by the portion of conductors 124 between the terminal 125 and a terminal 132 on the conductor 129. This insures the energization of the relays for both the "up" and "down" movement of the motor.

However it is to be understood that during the "up" movement contacts 111 and 120 are closed, while for "down" movement contacts 112 and 130 are closed.

The energization of the relay 86 causes it to close its contact 134 which connects the resistance elements of a motor accelerating system 135 to the bus bars 65 and 74 provided that service switches 136 and 137 are closed. However, for single revolutions of the motor, the resistance elements are left in circuit and the motor does not come to full speed. When operated from the third positions of the master controller 37, relays, hereinafter referred to, are energized to accelerate the motors to full speed. The details of the accelerating system 135 for the motor 24 are similar to those shown and described in the patent to Evans No. 1,479,033, January 1, 1924. Accordingly, a detailed description thereof is omitted from the present specification except insofar as is necessary to refer to the contacts 138, 139, 140, 141 and 142, and certain of the windings for completing other circuits. The contacts 138 and 139 on the contactors 102 and 104, respectively, cooperate to cause the motor to turn in the "up" direction and the contacts 140 and 141, hereinafter described, cause the motor to turn in a "down" direction.

The contact 142 is a back contact which controls the connection of a resistor in parallel with the motor armature. The circuit including the contact 134 extends from a terminal 144 on the motor accelerating system 135, through a conductor 145, the front contact 134 on the relay 86, a conductor 146, the windings 55 of the overload relay 49, and the bus bar 65 to the switch 45. Accordingly, upon an excessive amount of current traversing the motor accelerating system 135, the overload relay 49 is opened to deenergize the system by deenergizing the circuits which energize the relay 86.

The motor accelerating system comprises a series brake 147 and a series field winding 148, which are connected between a terminal 149 in the motor accelerating system and a terminal 150. From the terminal 150, different paths to the armature of the motor 24 may be completed through the combination of contacts 138 and 139 and 140 and 141. Changes in the direction of the current traversing the armature reverse the polarity of the armature relative to shunt windings 152 of the motor, thereby reversing its direction. The presence of a resistor 153 which is energized by the back contact 142 when the relay 128 is deenergized, provides a path for the dissipation of stored energy in the armature of the motor when the motor is stopped.

One of the circuits from the terminal 150 extends through a conductor 154, the contact 139, a terminal 155, a conductor 156, the armature of the motor 24, a conductor 157, a terminal 158, a conductor 159, and the contact 138, to a terminal 160. The terminal 160 is connected by a conductor 161 to the second winding 61 of the overload relay 52, and from thence to the bus bar 74 by a conductor 162. The foregoing circuit is the circuit used when the motor 24 is turning in the "up" direction of movement of the associated screw down.

For the "down" movement the circuit extends from the terminal 150 through a conductor 164, the contact 141 to a terminal 165 on an extension of the conductor 159, the latter connecting the terminal 165 with the terminal 158, which in turn is connected by the conductor 157 to the armature of the motor 24. The latter is connected by the conductor 156 to the terminal 155. From the terminal 155, a circuit extends through a conductor 166, the contact 140, a conductor 167 to the terminal 160 which is connected to the overload relay 52, as heretofore described.

A conductor 168 is connected from a terminal 169 on the conductor 167, the terminal 149 on the motor accelerating system 135, to the conductor 167 and thence to the bus bar 74. For shunting dissipating energy upon the stopping of the motor, the shunt windings 152 of both the motors 24 and 25 are connected in parallel between a terminal 170 on the bus bar 74 and a conductor 171. The conductor 171 is connected directly to the shaft of a service switch 136 so that the windings 152 are energized when the service switch 136 is closed. A tail piece 136ª on the switch 136, when the switch is in open position, completes a circuit from the switch shaft through a conductor 174 and a resistor 175 to the bus bar 74. Accordingly, when the switch 136 is open, a closed circuit is established through the windings 152 in parallel with the resistor 175. The relay 86 is provided with a front contact 176 for controlling certain of the relays in the motor accelerating system 135, when the controller is in either of its third positions. The circuit extends from the bus bar 65 through a conductor 177, relay windings 178 of the motor accelerating system 135 in parallel, a conductor 179, the contact 176, a conductor 180, the master controller 37 and a conductor 181 to the bus bar 74 and switch 47.

After the motor 24 has started to turn in either direction, the circuits persist until the motor has turned far enough to open the contact 110, whereupon the relay 104 is deenergized. The deenergization of the relay 104 causes its contact 111 to open and thereby make it impossible to again start the motor until the push button 35$^b$ has been depressed to complete the circuits heretofore described. The setting of the contacts 84 and 110 on the limit switch 28 determines the periods at which the contacts are opened and closed.

It is to be understood that if the "up" ultimate travel limit switch 30 is open at its contacts 100 and 106, it is impossible to again start the motor in an "up" direction. With the foregoing structure the motor 24 turns through one complete revolution upon each depression of the push button switch 35$^b$. Should the operator remove his hand from the switch 35$^b$ to deenergize the relay system before a complete operation has been effected, it will be necessary to bring the contact 84 into a closed position before the relay 86 may be reenergized. If the operator keeps his hand upon the button 35$^b$ the motor will stop at the end of the proper period until the cycle of operations has again been completed through the energization of the relay 79.

*"Down" movement of the motor 24 by the operation of switch contact 35$^a$*

During the "down" movement of the motor 24, the circuits for energizing the relay 79 are the same as for the "up" movement, and hence are not again described. In the "down" movement, the contactors 114 and 131 are energized and the contactors 102 and 104 remain deenergized. There are no ultimate travel limit switches in the circuits for the contactors 131 and 114, as the downward movement of the pressure roll is controlled by the presence of the other rolls in the stanchions, and by the overload relays for the motor. Upon the depression of the switch contact 35$^a$, a circuit is completed from the conductor 76, through the relays 114 and 131 in parallel, a conductor 182, the depressed contact 35$^a$, the terminal 115 on the conductor 108, the conductor 108, the contact 96, the conductor 109, the conductor 82, and the bus bar 74 to the switch 47.

The circuit by which the contact 112 of the contactor 114 is connected in parallel with the contact 96 has already been traced. The energization of the contactors 114 and 131 closes the contacts 112 and 130 by which the relays 86 and 128 are energized for performing the same functions as they perform when the motor is moving in the "up" direction.

The energization of the contactors 114 and 131 closes the contacts 140 and 141, respectively, in the motor accelerating system 135, but with the polarity of the armature of the motor 24 reversed with respect to its polarity during the "up" movement. The circuit through the contacts 140 and 141 between the terminals 150 and 160 extends from the terminal 150 through the conductor 164, the contact 141, the terminal 165, the conductor 159, the terminal 158, the conductor 157, the armature of the motor 24, the conductor 156, the terminal 155, the conductor 166, the contact 140, and the conductor 167 to the terminal 160. As the circuits from the terminals 150 and 160 to the bus bars have already been traced, a repetition of these portions of the circuits is omitted. During the "down" movement of the motor, the contacts 84 and 110 of the limit switch 30 cooperate to stop the motor after the completion of one turn in the same manner as they do for stopping it during the "up" movement of the motor 24.

*Operation of the motor 25 by the depression of switch 35$^b$*

The push button control system for the motor 25 is substantially identical with the control system for the motor 24. Accordingly, the relays conductors and contacts of the control system for the motor 25 have been given the same reference numerals with a suffix "'" (prime). A clear understanding of the control of the motor 25 is had by adding suffix "'" (prime) after the relays and conductors described in connection with the control of the motor 24. The reference numerals with the suffix have been applied to the drawings.

*The control of both screw downs from a single motor*

The control system so far described in detail has referred to the operation of a single screw down from its normally connected motor. By manipulation of the clutch 27, it is possible to drive both screw downs from either the motor 24 or 25. The circuit for the clutch 27 is controlled by the contacts 190 of the master controller 37. The drum 191 of the switch 37 can be moved in either of two directions for controlling the raising or lowering of screw downs, as hereinafter described.

During all stages of movement in either direction from the neutral position of the drum 191, one or the other of the contacts 190 engages a terminal 192 by which a circuit is completed from the bus bar 65 through a conductor 194, the winding of contactor 41, a conductor 195, the terminal contact 192, one of the contacts 190, the conductor 181, and the bus bar 74 to the switch 47. The energization of the contactor 41 causes it to close its front contacts 42 and 44, thereby causing a circuit from the bus bar 65 through a conductor 196, the contact 42, a conductor 197, the clutch 27, the conductor 198, the contact 44, the conductor 199, the conductor 109, the conductor 82 and the bus bar 74 to the switch 47.

*The control of both motors for "up" movement by the master control 37*

The "up" and "down" directions of movement of the drum 191 is shown by arrows in Figures 3 and 6. When the drum is moved to its second position in either direction, a contact 200 is brought into engagement with a contact 201 for completing the circuit of the relay 38. The circuit extends from the bus bar 65 through the conductor 194, the windings of the relay 38, a conductor 202, the contacts 200 and 201, the conductor 181, and the bus bar 74 to the switch 47.

The energization of the relay 38 closes its contacts 39 and 40 for tying the control systems for the motors 24 and 25 together. But as the contacts 39 and 40 are open circuited to the bus bar 74 at the master controller 37, the conductors 107 and 107′ are connected. The complete tie-in circuit extends from the terminal 98 on the conductor 76 through the conductor 99, the contact 100, the conductor 101, the windings of contactors 102 and 104 in parallel circuit, the conductor 105, the contact 106, the conductor 107, a conductor 204, the contact 39, a conductor 206, the conductor 107′, the contact 106′, a conductor 105′, the windings of the contactors 102′ and 104′ in parallel circuit, the conductor 101′, the contact 100′, and the conductor 99′ to the terminal 98′ on the conductor 76. By depressing either the contact 35ᵇ or 36ᵇ, the conductors 107 or 107′ are connected to the bus bar 74 by circuits explained in connection with the operation of the separate motors for a single "up" step movement. The tie conductor 204 is accordingly connected to the bus bar 74 and both motors turn one revolution under the control of the limit switches 28 and 29, but with the clutch 27 energized to lock the motors together.

In the "down" movement the contact 40 connects the conductors 182 and 182′ from similar terminals of the switch contacts 35ᵃ and 36ᵃ. In the third position of the controller 37, the tie-in circuits are so connected that the limit switches 28 and 29 are rendered ineffective for stopping the motors at the end of each revolution. This is done by short circuiting the limit switches 28 and 29 and the push button switches 35ᵇ and 36ᵃ through the controller 37.

The contact 39 is connected by a conductor 204 to the conductors 107 without being in series with the open push button switches 35ᵇ and 36ᵇ. From the conductor 107, a circuit extends through the contact 106 of the limit switch 30, to the conductor 105, which controls the contacts 102 and 104 without the energization of the conductor 105 through the contacts 96 and 111 or 112, for the reason that the contact 39 is connected by a conductor 206 to a contact 207 on the drum 191 which engages a contact 208 in the third step of the "up" movement of the drum for energizing the contactors 102 and 104 to perform the same functions in the same sequence as they perform when controlled by the push buttons 35ᵇ and 36ᵇ.

The conductor 206 is likewise connected to the conductor 107′ of the relay system for the motor 25. Accordingly, the master control in its third position simultaneously moves both motors in the "up" direction, and as the clutch 27 is energized, both motors are interlocked. The contacts 176 and 176′ of the relays 86 and 86′ are connected to a terminal 209 which engages contacts 210 on the drum 191 in either the third step of the "up" or "down" movement of the controller.

*The control of the circuits by the master switch for "down" movement*

The "down" movement of the master switch 37 closes the clutch circuits through engagement of contacts 190 and 192. In the second step the contacts 200 and 201 are brought into engagement for completing the circuit of the relay 38. As heretofore described, the system is under the control of the push button switches in the second position by the connection of the conductors 182 and 182′ through the contact 40. In the third position, a contact 211 is brought into engagement with a contact 212 for completing a circuit through the contact 40 of the relay 38, thereby tying the relays 114, 131, 114′, 131′ together through the conductor 214.

The connection is made to the conductor 214 so that the circuits are independent of the push button switches 35ᵃ and 36ᵃ. The circuit extends from the switch 47 through the bus bar 74, the conductor 181, the contacts 211 and 212, a conductor 214 which has connections to one side of the contact 40. The conductor 214 extends to the conductor 182′ which connects the terminals of the contactors 114′ and 131′. A branch of the conductor 214 is connected through the contact 40 to the conductor 182 which is connected to the common terminal of the contactors 114 and 131. Accordingly, the control of the movement of both motors in the "down" direction is carried out independently of the push button switches 35ª and 36ª, and the one step limit switches 28 and 29 associated with the motor.

While I have illustrated and described the present preferred embodiment of my invention in connection with screw downs, it is to be understood that various changes may be made therein and that it may be used in connection with other apparatus without departing from the scope of the appended claims.

I claim:

1. In a motor control system, a plurality of motors, a relay system associated with each motor for starting the motor and for controlling the direction of and the amount of rotation of the motor, an electro-responsive clutch for connecting the motors to cause any motor to be driven by another motor, and a controller having a plurality of groups of relatively movable contact members, one of which groups controls the energization of said clutch in a plurality of positions of the controller, said controller being so connected to the relay systems for the different motors that in one of its positions another group of contact members controls the interconnection of the relay systems for causing the motors to turn in a definite direction.

2. In a motor control system, a plurality of motors, a relay system associated with each motor for starting the motor and for controlling the direction of and the amount of rotation of the motor, an electro-responsive clutch for connecting the motors to cause any motor to be driven by another motor, and a controller having a plurality of groups of relatively movable contact members, one of which groups controls the energization of said clutch in a plurality of positions of the controller, said controller being so connected to the relay systems for the different motors that in one of its positions another group of contact members controls the interconnection of the relay systems for causing the motors to turn in a definite direction, and in another of its positions another group of contact members causes the motors to turn in an opposite direction.

3. In a motor control system, a plurality of motors, starting switches for the motors, a relay system associated with each motor for starting the motor and for controlling the direction of and the amount of rotation of the motor, an electro-responsive clutch for connecting the motors to cause any motor to be driven by another motor and a controller having a plurality of groups of relatively movable contact members, one of which groups controls the energization of said clutch in a plurality of positions of the controller other than the neutral position, said controller being so connected to the relay systems for the different motors that in one of its positions another group of contact members controls the interconnection of the relay systems for causing the motors to turn in a definite direction independently of the starting switches associated with the different relay systems.

4. In a motor control system, a plurality of motors, a relay system comprising a starting switch associated with each motor for starting the motor and for controlling the direction of and the amount of rotation of the motor, an electro-responsive clutch for connecting the motors to cause any motor to be driven by another motor, and a controller having a plurality of groups of relatively movable contact members, one of which groups controls the energization of said clutch in a plurality of positions of the controller, said controller being so connected to the relay systems for the different motors that in one of its positions another group of contact members controls the interconnection of the relay systems for causing the motors to turn in a definite direction, and in another of its positions another group of contact members causes the motors to turn in an opposite direction independently of the starting switches associated with the different relay systems.

5. In a motor control system, a plurality of motors, a limit switch associated with each motor for controlling its rotation, a starting switch for each motor, a relay system associated with each motor for connecting the associated starting switch, motor and limit switch, a clutch for connecting the motors, a controller having a plurality of groups of contact members, one of said groups of contact members completing a circuit to the clutch in a plurality of operating positions of the controller, another of the groups of contact members in one position of the controller, completing circuits for interconnecting the relay systems of the motors for causing the motors to rotate in one direction independently of the starting switches and limit switches associated with the separate motors.

6. In a motor control system, a plurality of motors, a limit switch associated with each motor for controlling its rotation, a starting switch for each motor, a relay system associated with each motor for connecting the associated starting switch, motor and limit switch, a clutch for connecting the motors, a controller having a plurality of groups of contact members, one of said groups of contact members completing a circuit to the clutch in a plurality of operating positions of the controller, another of the groups of contact members, in one position of the controller, completing circuits for interconnecting the relay systems of the motors for causing the motors to rotate in one direction independently of the starting switches and limit switches associated with the separate motors, and another group of contact members on the controller, when the controller is in another position, completing circuits for interconnection to the relay systems for causing the motors to rotate in a reverse direction.

7. In a motor control system, a plurality of motors, a relay system associated with each motor for starting the motor and for controlling the direction of and the amount of rotation of the motor, a clutch for connecting the motors to cause any motor to be driven by another motor, and a controller having a plurality of groups of relatively movable contact members, said controller causing the operation of said clutch in a plurality of positions of the controller, said controller being so connected to the relay systems for the different motors that in one of its positions a group of contact members controls the interconnection of the relay systems for causing the motors to turn in a definite direction.

8. In a control system for a plurality of motors, a separate control system for each of the motors, each control system comprising a control switch, means for mechanically interlocking a plurality of said motors, and a controller for controlling the interlocking means and for completing circuits for connecting the control systems of the interlocked motors so that a plurality of motors may be controlled from the switch in any one of the connected motor control systems.

In testimony whereof I have hereunto set my hand.

LANE JOHNSON.